United States Patent [19]

Lau et al.

[11] Patent Number: 5,440,450

[45] Date of Patent: Aug. 8, 1995

[54] HOUSING COOLING SYSTEM

[75] Inventors: Tim O. Lau, Milpitas; Alexander Huang, Menlo Park; Douglas P. Lo, San Jose, all of Calif.

[73] Assignee: NeXT, Inc., Redwood City, Calif.

[21] Appl. No.: 247,493

[22] Filed: May 23, 1994

Related U.S. Application Data

[63] Continuation of Ser. No. 582,625, Sep. 14, 1990, abandoned.

[51] Int. Cl.$^6$ ............................................. H05K 7/20
[52] U.S. Cl. ..................................... 361/695; 361/707
[58] Field of Search ........................... 165/104.33, 122; 361/687, 690, 694–697, 704, 707, 724–725; 364/708

[56] References Cited

U.S. PATENT DOCUMENTS

| | | | |
|---|---|---|---|
| 4,149,218 | 4/1979 | Carrubba et al. | 361/384 |
| 4,513,351 | 4/1985 | Davis et al. | 361/384 |
| 4,620,263 | 10/1986 | Ito | 361/690 |
| 4,769,557 | 9/1988 | Houf et al. | 361/687 |
| 4,908,734 | 3/1990 | Fujioka | 361/690 |
| 5,105,336 | 4/1992 | Jacoby et al. | 361/690 |

OTHER PUBLICATIONS

"IBM Tech. Disclosure Bulletin", Gaunt et al, Cooling Electrical Equipment, vol. 20, No. 6, Nov. 1977, pp. 2428-2429.

"Air-Conditioning Cabinets For Computer Centres" Horn, pp. 542-544.

*Primary Examiner*—Gregory D. Thompson
*Attorney, Agent, or Firm*—Hecker & Harriman

[57] ABSTRACT

A housing for a desk top personal computer incorporating a novel integrated cooling system. The housing features a cast magnesium chassis that acts as a heat sink that conductively absorbs heat from internal components. A recessed, rectangular, open-sided cooling channel is integrally formed in the bottom of the chassis. A fan is mounted to one end of the cooling channel. A series of fins running lengthwise extends down from the top of the channel. A power supply module, which dissipates heat from a conduction plate along its bottom, is mounted on the top side of the chassis directly above the channel. In operation, the fan draws air into the housing through a series of openings along the top back edge of the chassis. The air passes over the inside surfaces of the chassis, dissipating the relatively small amount of heat generated by the components mounted thereon and flows into the cooling channel. The air flows through the channel and across the surfaces of the fins extending down from the top of the channel, dissipating the heat generated by the power supply mounted directly above.

10 Claims, 4 Drawing Sheets

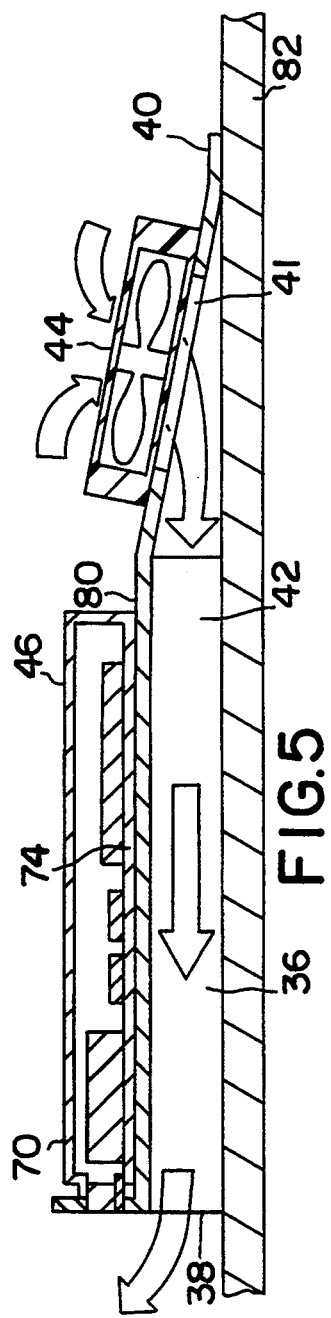
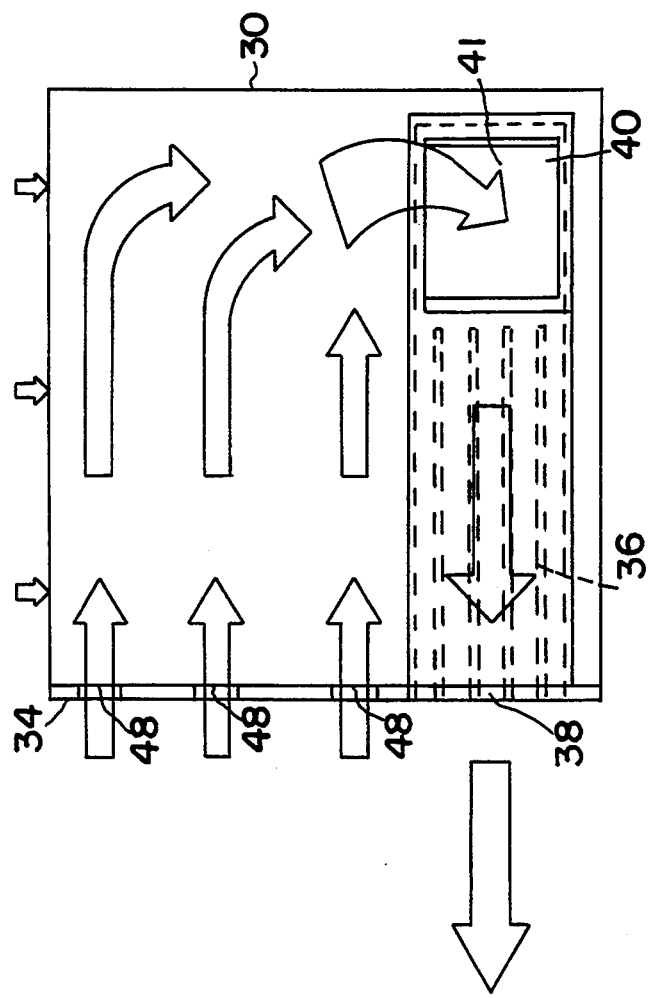

HOUSING COOLING SYSTEM

This is a continuation of application Ser. No. 582,625 filed Sep. 14, 1990 now abandoned.

FIELD OF THE INVENTION

This invention relates to the field of cooling systems for personal computers.

BACKGROUND OF THE INVENTION

The design of a housing for a typical desktop personal computer or workstation is, in part, constrained by the size and heat transfer requirements of the components contained in the housing. These components typically include electronic components mounted on printed circuit boards, one or more disk drives, and a power supply.

The heat generated by the power supply and other internal components must be removed to prevent overheating and resultant damage to those components. Also, heat generated by certain components, particularly the power supply, must be isolated from the other internal components, which are often temperature sensitive.

Prior art desk top computers typically include rectangular housings made of sheet metal or plastic. A typical prior art cooling system design for such a housing is shown in FIG. 1. The power supply 120 is typically mounted adjacent to the back wall 125 of the housing. A fan 130 is mounted in a vertical position immediately in front of or in back of the power supply. The housing shown in FIG. 1 also includes a floppy disk drive module 140, a hard disk drive module 145, and a main printed circuit board 150. A series of vent openings 135 are formed in the housing to receive an influx of ambient air. As shown by the arrows in FIG. 1, the vent openings are typically distributed along the front, back and sides of the housing to provide for sufficient distribution of cooling air to the internal components. Air enters the housing through vent openings 135, is drawn by fan 130 through the housing and through power supply 120, and is finally exhausted through an outlet 155 at the back of the housing.

Power supply 120 of the prior art cooling system shown in FIG. 1 is cooled by air circulated by the fan 130 through the power supply's housing 160. Heat is transferred from the power supply to the cooling air inside of the housing itself. The surface area of the available heat transfer surfaces is limited by the housing's physical size. In desktop computer designs, housings of relatively small size and volume are preferred to accommodate a small desk area. In general, the degree of cooling that can be achieved by electronic component housing cooling systems is dependent on the volume and velocity of the air flowing over the heat transfer surfaces of the devices being cooled and by the surface area of those heat transfer surfaces. To provide an adequate amount of cooling, therefore, given the limited size of the power supply housing 160, a relatively large volume of cooling air is required.

The volume of the available airflow is dependent on the volumetric flow rate of the cooling fans used. This, in turn, is dependent on the size and speed of the cooling fans. A given volume of airflow can be achieved by a small, high speed fan or, equivalently, by a large, slow speed fan. As the speed of the fan increases, so does the level of noise and vibration caused by the fan. For a vertically mounted fan, such as is typical in the prior art, the maximum size of the fan (that is, the fan diameter or blade size 'tip to tip') is limited by the height of the housing. Prior art housings therefore have had to have a sufficiently high vertical dimension to accommodate a fan of sufficient blade size, and thus to provide the necessary volume of cooling air without creating unacceptable noise and vibration levels.

The above-described prior art cooling system has several drawbacks. One is physical size, particularly the height, which requires the use of a sufficiently tall housing. Because ambient cooling air typically enters and/or exits the housing from the exposed sides, sufficient clearance must also be maintained around the housing to allow unimpeded air flow to the vent openings. This requirement can add 6" to 8" or more to the housing length and width, and thus to the amount of desk space required for the housing. The air inlet and exhaust vent openings on the front and sides of the housing, in addition to allowing cooling air in, also allow noise created by the fan and other internal components (such as disk drives) to be transmitted outside of the housing.

Various methods to increase the heat dissipation from heat generating components of computers or other electronic equipment are known in the prior art.

U.S. Pat. No. 4,702,154 issued to Dodson discloses the use of a fan mounted at an inclined angle.

U.S. Pat. No. 4,237,521 issued to Denker discloses the use of an internally mounted heat sink with diagonal fins to which heat generating electronic components such as transistors can be mounted.

U.S. Pat. No. 4,797,783 issued to Kohmoto et al discloses the use of multiple sets of fans.

U.S. Pat. No. 4,513,351 issued to Davis et al discloses the use of channels to distribute cooling air to heat generating computer components.

U.S. Pat. No. 4,520,425 issued to Ito and U.S. Pat. No. 4,644,443 issued to Swensen et al disclose the use of partitions and baffles to more effectively channel cooling air over heat generating electronic components.

Although structures such as those disclosed by the above patents may provide varying degrees of cooling, they add bulk, complexity, cost and inefficiency that has generally made their use less than optimal in desktop workstations.

SUMMARY OF THE PRESENT INVENTION

The present invention provides a cooling system for an electronic device such as a desktop "workstation" or computer that can be integrated into a low-profile housing less than 2.5 inches high. In the preferred embodiment the housing has a cast magnesium chassis and cover. The cover forms the front, top, and two sides of the housing. Its exposed surfaces are covered with a molded plastic shell, which in effect acts as a thermal and audio insulator. As a result, very little heat is transferred through the exposed surfaces of the housing.

Instead, the chassis, which forms the bottom and the back of the housing, features an integrated heat transfer system that absorbs heat from the internal components within the housing and exhausts that unwanted heat to the environment through the back of the housing.

A recessed, open-sided, substantially rectangular external air channel is integrally formed in the bottom of the chassis and is oriented substantially parallel to the sides of the housing. In use, the chassis is supported on a table or other work surface. The table or other surface substantially seals the open side of the channel, in effect forming the channel's "fourth wall."

The back of the channel has its terminus at an opening at the back of the chassis. The front of the channel terminates at an inclined face near the front of the chassis. A fan is mounted to an opening in the inclined face. A series of heat dissipating fins extends from the top of the channel substantially along its length. A conduction-cooled power supply module, which dissipates heat from a conduction plate along its bottom, is mounted on the top side of the chassis directly above the recessed external channel.

In operation, the fan draws ambient air into the housing through a series of openings along the upper edge of the back of the chassis and through a series of vent holes along the right side of the housing. The air passes over the inside surfaces of the chassis, substantially absorbing the heat generated by the motherboard components and disk drives mounted to the chassis. The fan then directs this now warmer air into the recessed finned channel through the inclined face in the chassis. This air flows through a passage formed by the channel and the surface on which the housing rests and across the surfaces of the heat-dissipating fins extending down from the top of the channel, thereby absorbing the heat generated by the power supply mounted directly above. The present invention thus provides efficient heat transfer while having a low profile and a limited exterior heat transfer surface. In addition, since the channel, the fins, and the air intake openings are all integrally formed with the chassis, fabrication of the cooling system is simplified. Fan noise is also diminished by locating the fan at a position remote from exterior openings.

BRIEF DESCRIPTION OF THE DRAWINGS

FIG. 5 is a side sectional view showing the air flow through the cooling channel of the present invention.

FIG. 6 is a top view showing the air flow across the chassis of the present invention.

DETAILED DESCRIPTION OF THE INVENTION

Figure 1:
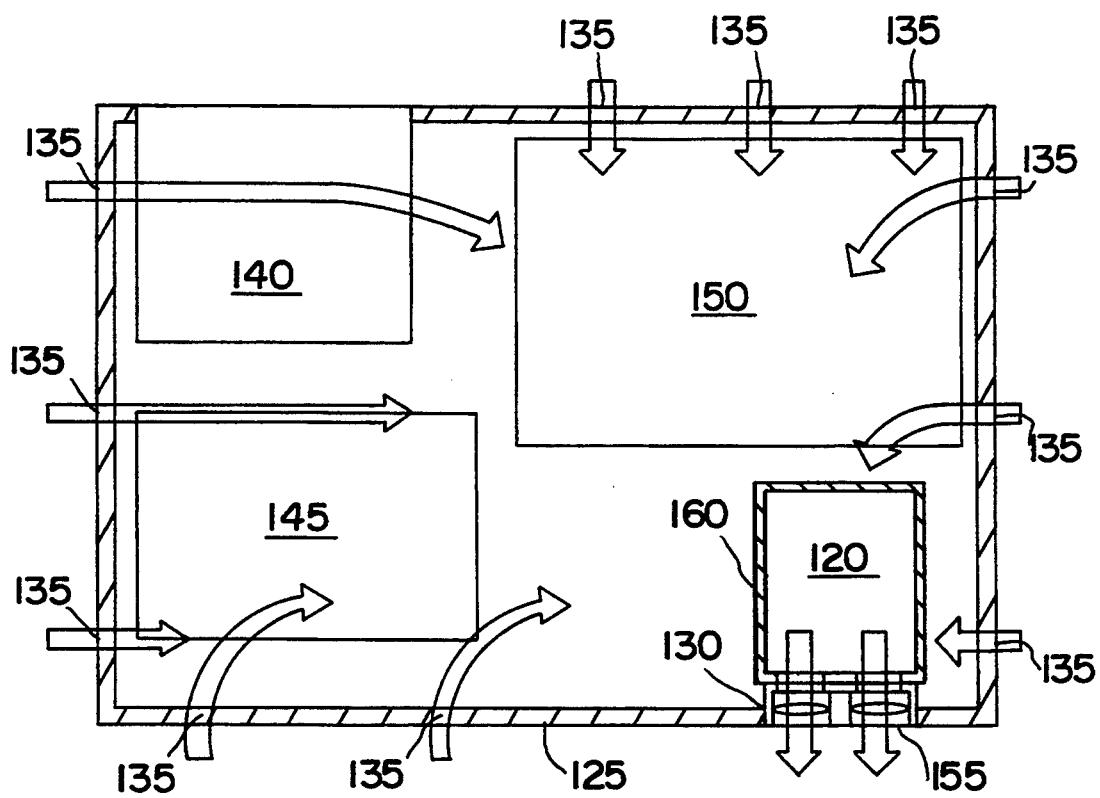
FIG. 1 is a top, sectional view of a typical desktop computer housing of the prior art.
Figure 2:
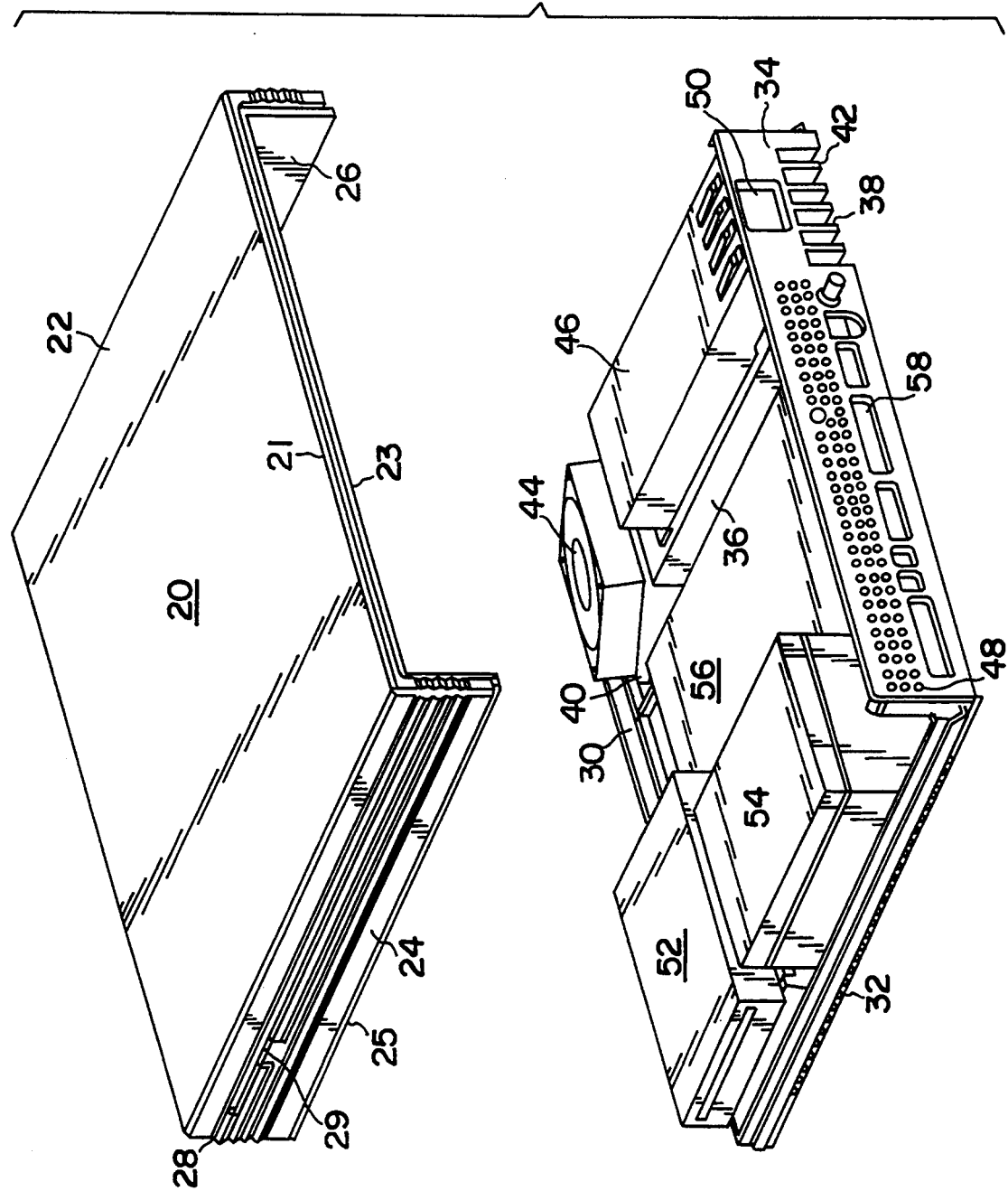
FIG. 2 is a perspective, exploded view of the preferred embodiment of the housing of the present invention showing the general layout of the housing and of the components within.

FIG. 2 shows a general layout of a desktop computer or workstation incorporating the housing and integral cooling system of the present invention. As illustrated in FIG. 2, the housing consists of a two-piece cover assembly 20 and a chassis 30. Together they form a uniform, low-profile housing approximately 15.7 inches wide, 14.4 inches deep, and less than 2.5 inches thick. No heat transfer fins or other mechanical features or devices are visible on the exterior surface of the housing in the user's ordinary view. Rather, the housing has a continuous and visually uniform surface.

In the present preferred embodiment, the cover 23 forms the top 22, left side 24, right side 26, and front 28 of the housing. The cover assembly's surfaces are formed by a metal cover 23 and a molded plastic outer shell 21, which fits over the cover 23. The cover 23 is cast from a lightweight and heat-conductive metal, preferably magnesium. Fabrication of the cover by casting (rather than by forming it from sheet metal as in the prior art, for example) enables wall thicknesses of approximately 0.12 inch to provide for a sturdy and rigid structure. The cover can, therefore, support a substantial amount of weight, such as that of a 20" color video monitor placed directly on its upper surface. The plastic outer shell is also approximately 0.1 inch thick and features an aesthetic finish. The smooth continuity of its lines and form is interrupted only by a floppy disk drive opening 29 on its left side.

Figure 3:
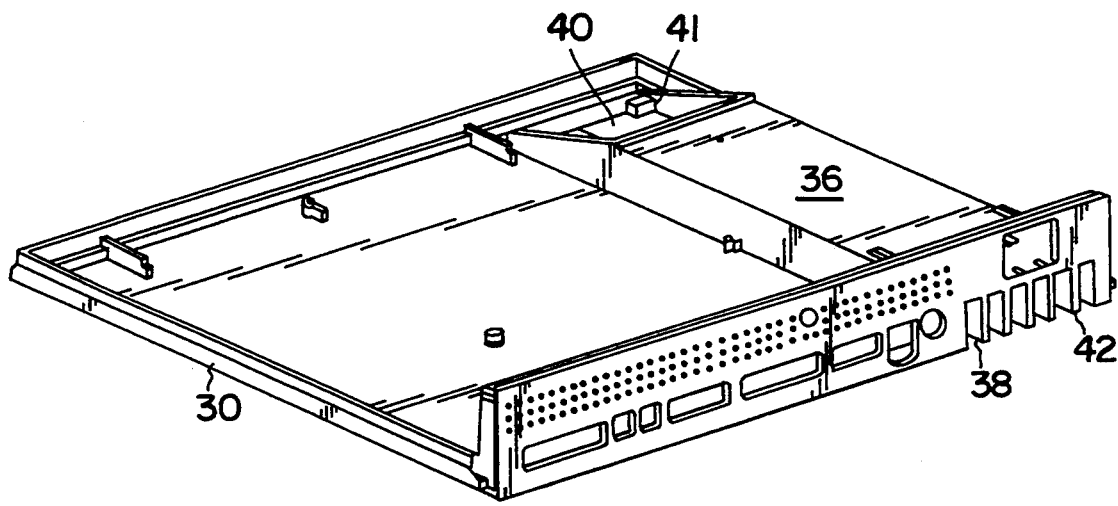
FIG. 3 is a top perspective view of the chassis of the preferred embodiment of the present invention.
Figure 4:
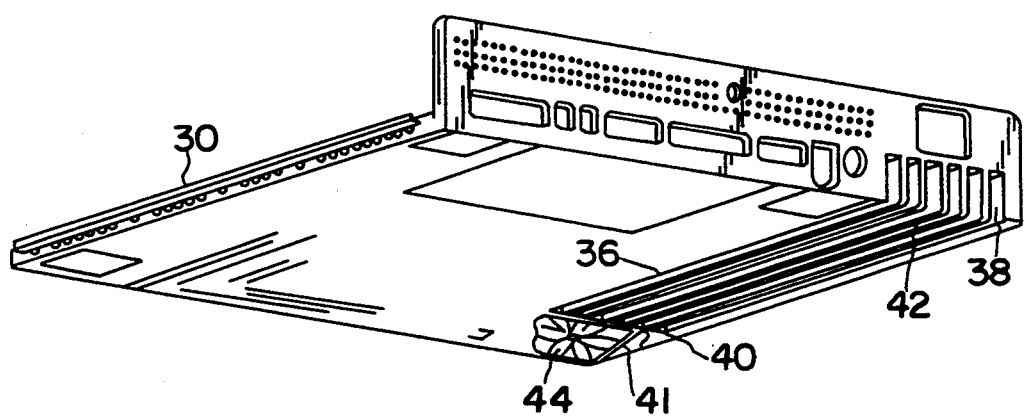
FIG. 4 is a bottom perspective view of the chassis of the preferred embodiment of the present invention.

The chassis 30 forms the bottom 32 and the back 34 of the housing. An inverted, open-sided, substantially rectangular cooling channel 36 is integrally formed near the right side of the chassis 30. In the preferred embodiment, cooling channel 36 is approximately 10.9 inches long and 3.1 inches wide. As shown more clearly in FIGS. 3 and 4, cooling channel 36 terminates at an opening 38 at the back of the chassis 30 and at an inclined face 40 located approximately 1 inch from the front edge of the chassis 30. Inclined face 40 is oriented at a substantially acute angle to the bottom 32, at an angle of 15 degrees in the preferred embodiment. A rectangular opening 41 having approximate dimensions of 3.2 by 3.2 inches is formed in inclined face 40. As shown in FIG. 2, a fan 44 is mounted over the opening in inclined face 40. Since the fan is supported at an incline, a fan having a diameter substantially greater than the height of the housing can be used. In the preferred embodiment, a 3.5 inch axial fan having a nominal rating of approximately 29 cubic feet per minute at zero static pressure is used.

Within the heat transfer passage formed by the cooling channel, a series of integrally formed fins 42 extend downward from the top of the channel over substantially all of its length. In the preferred embodiment, there are five parallel, equally spaced fins. Each fin is approximately 10.9 inches long, 0.1 inch thick, and 1 inch high, and extends substantially the entire length of the channel from back opening 38 to the front edge of inclined face 40. A power supply module 46, described in greater detail below, is mounted on the top of cooling channel 36.

The remaining principal internal components within the housing include floppy disk drive unit 52, a hard disk drive unit 54, and a motherboard 56. The motherboard 56 contains various large-scale integrated circuit devices, including the computer's central processing unit ("CPU"), memory chips, and proprietary video and data processing circuitry. Motherboard 56 is mounted directly to chassis 30. The motherboard is approximately 10.8 inches wide by 12.5 inches deep, and occupies substantially the entire top surface of the chassis 30 not occupied by the region of the cooling channel 36. The floppy disk drive unit 52, such as a Sony ® 2.88 MB 3.5" drive having outside dimensions of 4 by 1 by 5.9 inches, and the hard disk drive unit 54, such as a Maxtor ® 340 MB 3.5" drive having outside dimensions of 4 by 1.63 by 5.75 inches are mounted directly over motherboard 56 along the right side of the chassis.

A series of vent openings 48 and connector openings 50 is formed along the back 34 of the chassis 30. A series of small vent openings are also formed in the chassis just below the bottom right edge of the cover 23. These small vent openings are substantially hidden from view during normal orientation of the housing.

The operation of the cooling system of the present invention may best be described by reference to FIGS. 5 and 6. FIG. 5 is a sectional view taken along the center of the cooling channel 36 of FIG. 2. As shown in FIG. 5, power supply module 46 preferably comprises a sealed power supply housing 70 mounted on a thermal conduction plate 74. In the present preferred embodiment, a conduction-cooled power supply, such as Sony ® Model No. APS-21 100 Watt power supply is used. That power supply is 3 by 1.1 by 9.2 inches in size and generates heat at a rate of approximately 22 watts. Heat generated by power supply 46 can be dissipated via the thermal conduction plate 74, provided there is sufficient heat transfer from the bottom surface of conduction plate 74. Thus to provide this amount of heat transfer, conduction plate 74 is mounted directly to the top 80 of cooling channel 36. As previously described, fan 44 is mounted over opening 41 in inclined face 40 of cooling channel 36.

In operation, fan 44 draws air from inside the housing and forces it through cooling channel 36. As shown in FIGS. 5 and 6, this air enters the housing as ambient air primarily through vent openings 48 in the back wall 34 of chassis 30. Additional ambient air (indicated by the small arrows shown at the top of FIG. 6) also enters through the small vent openings along the lower right side edge of the chassis. These vent openings provide supplementary air to prevent stagnant air regions from forming along the right side of the housing. The incoming ambient air flows across chassis 30 as shown by the large arrows in FIG. 6 to absorb the heat generated by the disk drives 52 and 54 and by the electronic components mounted on motherboard 56. In the preferred embodiment, heat is generated by disk drives 52 and 54 and motherboard 56 at a rate of approximately 1 Watt, 12 Watts, and 13 Watts, respectively. This air, now warmer than its input temperature, is drawn into fan 44, absorbing the heat generated by the fan itself (in the preferred embodiment approximately 1.1 Watt). Fan 44 then forces the air into the opening 41 in inclined face 40 of cooling channel 36. The air flows through a heat transfer passage having three sides formed by cooling channel 36, and a bottom side formed by surface 82, which may be a table top or other work surface on which the housing rests. As the air flows through cooling channel 36, it absorbs heat from fins 42, which draw heat from the thermal conduction plate 74 of power supply 46 through top section 80 of cooling channel 36 and discharge the heat to the air flowing across their surfaces. The heated exhaust air exits cooling channel 36 through rear opening 38. In the preferred embodiment, heat is dissipated at a total rate of approximately 50 Watts, using an air flow of only 6 cubic feet per minute.

The integrated cooling system of the present invention provides significant advantages over cooling systems of the prior art. Integrally forming a cooling channel in the chassis of the housing simplifies manufacturing and reduces cost. Locating the cooling channel underneath the chassis but within the external spatial envelope of the housing increases the heat transfer area available without using up scarce exposed external surfaces. The recessed cooling channel of the present invention protects the cooling fins from damage and creates a compact, fully enclosed heat transfer passage which concentrates the air flow where needed most while isolating the heated exhaust air from sensitive internal components, providing more efficient heat transfer and requiring a reduced volume of cooling air.

The cooling channel of the present invention also allows the positioning of the fan near the front of the housing while confining the primary vent openings and the channel discharge opening to the back of the housing. This provides effective cooling of the entire interior of the housing using only a limited heat transfer external interface. Since only the back wall, and to a lesser extent the right side wall, are used for heat exchange with the outside environment, no clearance is required between the other outside surfaces and neighboring objects. This reduces the amount of desk top surface required for the housing, and allows more effective use of desk top space. The cooling channel of the present invention allows the fan to be located at a position remote from any external openings, reducing the level of fan noise that escapes to the outside and preventing foreign objects from coming in contact with the fan.

Although the present invention has been described with respect to the present preferred embodiment, other embodiments incorporating the inventive features of the present invention are possible. For example, instead of being situated along one side of the chassis, the cooling channel can be located elsewhere on the chassis, such as along its center. The cooling channel may alternately be recessed into the top, front, back or sides of the housing, rather than into the bottom. A different side other than the back can be used for transferring heat to the ambient environment. Rather than being rectangular and linear, the cooling channel can be more complex and may provide cooling surfaces for other devices in addition to the power supply. Depending on the heat transfer requirements of a particular device, fins may not be required, and a vertically or horizontally mounted fan, or fans may be used, or the fan may be eliminated. Several separate or interconnected cooling channels may be incorporated in a single chassis. The housing's chassis can be formed from non-thermal conductive materials such as resin or plastic. A plate may be used to cover the bottom of the channel if the PC is to be placed upon a very heat sensitive surface or if the housing is to be placed into an upright, rather than a flat, orientation, or the channel itself may be formed as a closed channel without an open side. Rather than being integrally formed with the chassis, the cooling channel can alternately be formed as a separate element. The cooling channel can also be contained entirely within the housing, providing that the heat transfer passage of the channel is separated from the rest of the interior of the housing and the exhaust air exits to the environment. The cross section of the cooling channel may have a triangular, rounded or other shape.

Other embodiments of the present invention will be apparent to those skilled in the art.

We claim:

1. An apparatus for dissipating heat from an enclosure comprising:

an open-sided heat transfer channel recessed into and integrally formed with a first side of an enclosure and having an open side external to said enclosure, said open-sided heat transfer channel comprising:

a first opening disposed for receiving a cooling fluid within said enclosure and from outside said channel; and a second opening for exhausting said cooling fluid from said channel;

wherein said channel forms a closed-sided heat transfer passage when the open side of said channel is disposed to a surface; and heat transfer means for transferring heat from a heat generating source within said enclosure to said cooling fluid within said channel, said heat transfer means comprising;

a heat absorption surface comprising a metal plate connected to said heat generating source, said heat absorption surface within said enclosure disposed substantially adjacent to and in thermal communication with said heat transfer channel and said heat generating source; and, a heat dissipation surface comprising at least one fin extending within said heat transfer channel, said heat dissipation surface in thermal communication with said heat absorption surface disposed within said heat transfer channel;

an electric fan for moving said cooling fluid through said heat transfer channel, said fan mounted at an acute angle to a longitudinal axis of said heat transfer channel, said heat transfer channel having a substantially longitudinal shape.

2. The heat dissipating apparatus of claim 1 wherein said first side comprises the bottom side of said enclosure.

3. The heat dissipating apparatus of claim 1 wherein said heat dissipation surface comprises at least one fin extending within said heat transfer channel.

4. The heat dissipating apparatus of claim 1 wherein said first and second openings are disposed at first and second ends of said heat transfer channel, respectively.

5. The heat dissipating apparatus of claim 4 further comprising transfer means for moving said cooling fluid through said heat transfer channel.

6. The heat dissipating apparatus of claim 1 wherein said fan is disposed adjacent to said first opening.

7. The heat dissipating apparatus of claim 1 wherein said heat transfer channel has a substantially U-shaped cross section.

8. The heat dissipating apparatus of claim 1 wherein said cooling fluid comprises air.

9. The heat dissipating apparatus of claim 2 wherein said bottom side is comprised of a cast metal.

10. The heat dissipating apparatus of claim 2 wherein said bottom side is comprised of sheet metal.

* * * * *